US010760903B2

(12) United States Patent
Nishihara et al.

(10) Patent No.: US 10,760,903 B2
(45) Date of Patent: Sep. 1, 2020

(54) MASTER DISK, MASTER DISK MOUNTING METHOD, AND MASTER DISK REMOVAL METHOD

(71) Applicant: MITSUBISHI HEAVY INDUSTRIES MACHINERY SYSTEMS, LTD., Hyogo (JP)

(72) Inventors: Yoshikazu Nishihara, Hiroshima (JP); Kunio Matsunaga, Hiroshima (JP); Tatsuya Ueda, Hiroshima (JP); Hiroaki Yoneda, Hiroshima (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 0 days.

(21) Appl. No.: 16/375,396

(22) Filed: Apr. 4, 2019

(65) Prior Publication Data
US 2019/0226839 A1 Jul. 25, 2019

Related U.S. Application Data

(63) Continuation of application No. 15/548,090, filed as application No. PCT/JP2015/085928 on Dec. 24, 2015.

(51) Int. Cl.
*G01B 21/20* (2006.01)
*G01M 17/02* (2006.01)

(52) U.S. Cl.
CPC .............. *G01B 21/20* (2013.01); *G01M 17/02* (2013.01)

(58) Field of Classification Search
CPC ................................ G01B 21/20; G01M 17/02
See application file for complete search history.

(56) References Cited

U.S. PATENT DOCUMENTS 7,128,119 B2    10/2006  Corghi
8,776,345 B2     7/2014  Komatsu et al.
(Continued)

FOREIGN PATENT DOCUMENTS

CN       1695965 A    11/2005
CN     102015427 A     4/2011
(Continued)

OTHER PUBLICATIONS

International Search Report and Written Opinion in PCT/JP2015/085928 dated Mar. 15, 2016. 14pp.
(Continued)

*Primary Examiner* — Nimeshkumar D Patel
*Assistant Examiner* — Jean F Morello
(74) *Attorney, Agent, or Firm* — Kanesaka Berner and Partners LLP (57) ABSTRACT

A master disk which simulates a tire and is used at the time of confirmation or correction of measurement accuracy of a geometry measuring device for measuring the surface shape of a tire, of a tire testing machine, includes: a simulated tire section simulating a tire; a lower tubular section having a cylindrical shape, in which the tip side thereof is connected to the lower end side of the simulated tire section so as to be coaxial with the simulated tire section and a guide surface inclined in a tapered shape so as to have a larger diameter toward the base end side is formed on the base end side of an inner peripheral surface; and a neck section and a flange section which are provided on the upper end side of the simulated tire section and detachably engaged with test rim moving and exchanging means of a tire holding device of the tire testing machine.

5 Claims, 6 Drawing Sheets

(56) References Cited

U.S. PATENT DOCUMENTS

| | | |
|---|---|---|
| 9,046,445 B2 | 6/2015 | Ueda et al. |
| 9,194,767 B2 | 11/2015 | Tachibana et al. |
| 9,625,353 B2 | 4/2017 | Takahashi et al. |
| 2008/0148805 A1 | 6/2008 | Mahoney et al. |
| 2009/0040533 A1 | 2/2009 | Takahashi et al. |
| 2011/0113875 A1 | 5/2011 | Okada et al. |
| 2014/0069180 A1 | 3/2014 | Ueda et al. |
| 2014/0191480 A1 | 7/2014 | Miyazaki et al. |

FOREIGN PATENT DOCUMENTS

| | | |
|---|---|---|
| CN | 204214657 U | 3/2015 |
| DE | 112012004720 T5 | 8/2014 |
| EP | 2023078 A1 | 2/2009 |
| JP | H4-256824 A | 9/1992 |
| JP | 3037449 B2 | 4/2000 |
| JP | 2009-41934 A | 2/2009 |
| JP | 2011-174839 A | 9/2011 |
| JP | 2012132899 A | 7/2012 |
| JP | 5089286 B2 | 12/2012 |
| JP | 2013-104744 A | 5/2013 |
| JP | 2013-142674 A | 7/2013 |
| JP | 2014-202676 A | 10/2014 |
| TW | 304482 U | 5/1997 |
| WO | 2013/069407 A1 | 5/2013 |
| WO | 2014109183 A1 | 7/2014 |

OTHER PUBLICATIONS

Office Action in TW Application No. 104143622 dated Mar. 6, 2017, 6pp.

MASTER DISK, MASTER DISK MOUNTING METHOD, AND MASTER DISK REMOVAL METHOD

RELATED APPLICATIONS

The present application is a Continuation of U.S. application Ser. No. 15/548,090, filed Aug. 1, 2017, which is a National Phase of International Application Number PCT/JP2015/085928, filed Dec. 24, 2015. The disclosures of all of the above-listed applications are hereby incorporated by reference herein in their entirety.

TECHNICAL FIELD

The present invention relates to a master disk which simulates a tire and is used at the time of confirmation or correction of the measurement accuracy of a geometry measuring device for measuring the surface shape of a tire, of a tire testing machine, a method of mounting the master disk on a spindle of a tire holding device of the tire testing machine, and a method of removing the master disk from the spindle.

BACKGROUND ART

With respect to tires for a vehicle or the like, after manufacturing thereof, a shape inspection of inspecting the presence or absence of a defect by measuring a surface shape such as concavity and convexity or undulation is performed in a tire testing machine. As a geometry measuring device which is used for measurement of the surface shape of such a tire, for example, a geometry measuring device made so as to be able to inspect the presence or absence of a defect of the surface shape such as concavity and convexity or undulation of a tire by measuring the tire with a laser displacement meter or the like while irradiating the tire with a laser beam while rotating a spindle of a tire holding device of a tire testing machine, after the tire is held by a test rim mounted on the spindle, is known (refer to PTL 1 below).

In such a tire shape measuring device, if the above-described inspection is performed by a specified number of times or for a specified period of time in order to maintain measurement accuracy, confirmation or correction of the measurement accuracy is performed by mounting a tire-simulated master disk instead of the test rim on the spindle and measuring the surface shape of the master disk.

CITATION LIST

Patent Literature

[PTL 1] Japanese Unexamined Patent Application Publication No. 2014-202676
[PTL 2] Japanese Unexamined Patent Application Publication No. 2013-104744
[PTL 3] Japanese Unexamined Patent Application Publication No. 2011-174839
[PTL 4] Japanese Unexamined Patent Application Publication No. 2013-142674

SUMMARY OF INVENTION

Technical Problem

When performing confirmation or correction of the measurement accuracy of the tire shape measuring device as described above, since a worker manually mounts the master disk on the spindle of the tire holding device of the tire testing machine or removes the master disk from the spindle, a lot of time and effort are required for master disk mounting work or master disk removal work, and thus a great load is applied to the worker, and furthermore, a time when the work of inspecting the surface shape of the tire is temporarily stopped is long, causing a decrease in working efficiency.

Therefore, the present invention has an object to provide a master disk in which mounting work or removal work can be easily carried out, a method of mounting the master disk, and a method of removing the master disk.

Solution to Problem

In order to solve the above-described problem, according to a first aspect of the present invention, there is provided a master disk which simulates a tire and is used at the time of confirmation or correction of measurement accuracy of a geometry measuring device for measuring a surface shape of a tire, of a tire testing machine, the master disk being able to be mounted on and removed from automatic exchange means.

According to a second aspect of the present invention, in the master disk according to the first aspect of the present invention, the master disk includes: a simulated tire section simulating a tire; a first tubular section having a cylindrical shape, in which a tip side thereof is connected to one end side in an axial direction of the simulated tire section so as to be coaxial with the simulated tire section and a guide surface inclined in a tapered shape so as to have a larger diameter toward a base end side is formed on the base end side of an inner peripheral surface; and an engaging member which is provided on the other end side in the axial direction of the simulated tire section and detachably engaged with the automatic exchange means.

According to a third aspect of the present invention, in the master disk according to the second aspect of the present invention, the engaging member includes a neck section disposed on the other end side in the axial direction of the simulated tire section so as to be coaxial with the simulated tire section, and a flange section coaxially provided at the neck section and having a larger diameter than the neck section.

According to a fourth aspect of the present invention, in the master disk according to the third aspect of the present invention, the engaging member further includes a second tubular section having a cylindrical shape, in which a base end side thereof is connected to the other end side in the axial direction of the simulated tire section so as to be coaxial with the simulated tire section, and a lid section which is provided on a tip side of the second tubular section and on which the neck section is mounted.

According to a fifth aspect of the present invention, in the master disk according to any one of the second to fourth aspects of the present invention, the automatic exchange means is test rim moving and exchanging means of a tire holding device of the tire testing machine.

Further, according to a sixth aspect of the present invention, there is provided a master disk mounting method which is a method of mounting the master disk according to the fifth aspect of the present invention on a spindle of a tire holding device of a tire testing machine, including: transferring the master disk such that a base end side of the first tubular section of the master disk is fitted on the spindle, after the test rim moving and exchanging means of the tire holding device of the tire testing machine is engaged with the engaging member of the master disk so as to hold the master disk placed on a stocker frame of a rim stocker of the tire testing machine.

Further, according to a seventh aspect of the present invention, there is provided a master disk removal method which is a method of removing the master disk according to the fifth aspect of the present invention mounted on a spindle of a tire holding device of a tire testing machine from the spindle, including: transferring the master disk such that a base end side of the first tubular section of the master disk is placed on a stocker frame of a rim stocker of the tire testing machine, after the test rim moving and exchanging means of the tire holding device of the tire testing machine is engaged with the engaging member of the master disk so as to hold the master disk mounted on the spindle.

Further, according to an eighth aspect of the present invention, there is provided a tire shape inspection method including repeatedly performing: a test rim mounting step of transferring a test rim placed on a stocker frame of a rim stocker of a tire testing machine by test rim moving and exchanging means of a tire holding device of the tire testing machine such that the test rim is held by the tire holding device; an inspection step of performing inspection of a tire by holding the tire with the test rim of the tire holding device and measuring a surface shape of the tire with a geometry measuring device; a test rim removal step of transferring the test rim of the tire holding device by the test rim moving and exchanging means of the tire holding device such that the test rim of the tire holding device is placed on the stocker frame of the rim stocker, after the inspection step is performed by a specified number of times or for a specified period of time; a master disk mounting step of mounting the master disk according to the fifth aspect of the present invention on the spindle of the tire holding device from the stocker frame of the rim stocker by using the mounting method according to the sixth aspect of the present invention, with respect to the tire holding device from which the test rim is removed; a confirmation and correction step of performing confirmation or correction of measurement accuracy of the geometry measuring device by measuring the master disk mounted on the spindle of the tire holding device with the geometry measuring device; and a master disk removal step of removing the master disk mounted on the spindle of the tire holding device from the spindle by using the removal method according to the seventh aspect of the present invention and transferring the master disk to the stocker frame, after the confirmation and correction step is performed.

Advantageous Effects of Invention

According to the present invention, since the master disk can be mounted on and removed from automatic exchange means, master disk mounting work or master disk removal work can be performed with the automatic exchange means. Therefore, it is not necessary for a worker to manually perform master disk mounting or removal, and thus it is possible to remarkably reduce a load on the worker. Further, a time when the work of inspecting the surface shape of the tire is interrupted can be greatly shortened, and thus it is possible to remarkably suppress a decrease in working efficiency. As a result, it is possible to easily perform the master disk mounting work or the master disk removal work, and thus it is possible to greatly improve the efficiency of the work of inspecting the surface shape of the tire.

DESCRIPTION OF EMBODIMENTS

Embodiments of a master disk, a method of mounting the master disk, and a method of removing the master disk according to the present invention will be described based on the drawings. However, the present invention is not limited to only the embodiments which are described based on the drawings.

Main Embodiments

Main embodiments of the master disk, the method of mounting the master disk, and the method of removing the master disk according to the present invention will be described below on the basis of FIGS. 1 to 6.

Figure 1:
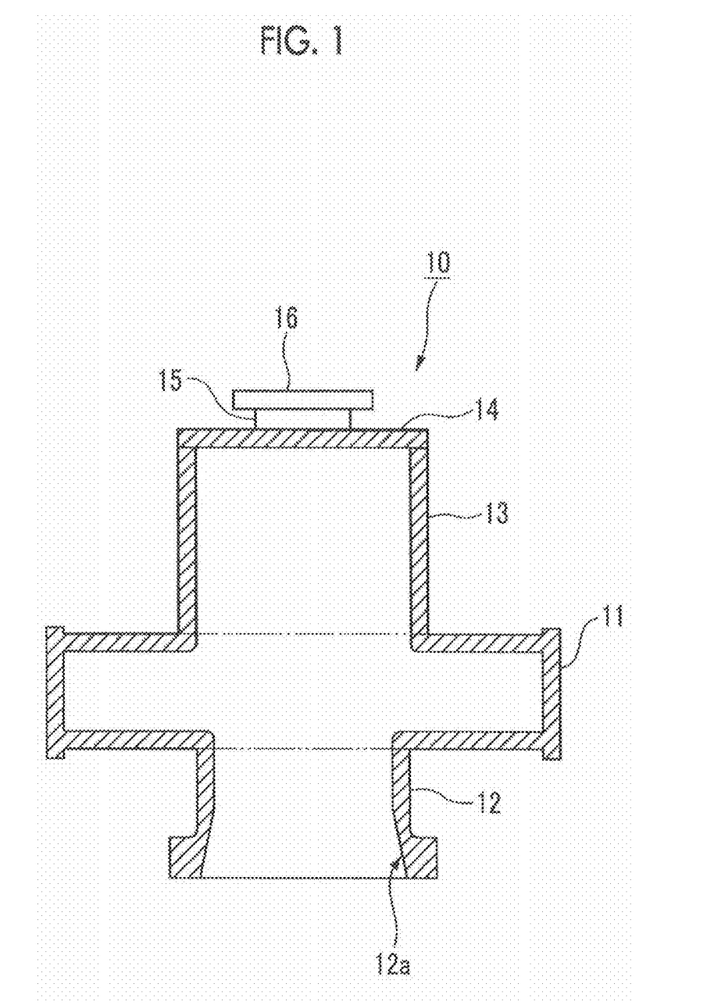
FIG. 1 is a sectional view showing a schematic structure of a main embodiment of a master disk according to the present invention.

The master disk according to this embodiment is a master disk 10 which simulates a tire and is used at the time of confirmation or correction of the measurement accuracy of a geometry measuring device for measuring the surface shape of a tire, of a tire testing machine, the master disk 10 being provided with: a simulated tire section simulating a tire and oriented such that an axial direction thereof is directed in an up-and-down direction; a lower tubular section 12 that is a first tubular section having a cylindrical shape, in which the tip side (the upper end side) thereof is connected to one end side (the lower end side) in the axial direction of the simulated tire section 11 so as to be coaxial with the simulated tire section 11 and a guide surface 12a inclined in a tapered shape so as to have a larger diameter toward the base end side (the lower end side) is formed on the base end side (the lower end side) of an inner peripheral surface; an upper tubular section 13 that is a second tubular section having a cylindrical shape, in which the base end side (the lower end side) thereof is connected to the other end side (the upper end side) in the axial direction of the simulated tire section 11 so as to be coaxial with the simulated tire section 11; a disk-shaped lid section 14 coaxially mounted on the tip side (the upper end side) of the upper tubular section 13 so as to close the tip side (the upper end side) of the upper tubular section 13; a columnar neck section 15 disposed on the other end side (the upper end side) in the axial direction of the simulated tire section 11 so as to be coaxial with the simulated tire section 11, and coaxially mounted on the lid section 14; and a disk-shaped flange section 16 coaxially mounted on an upper portion of the neck section 15 and having a larger diameter than the neck section 15, as shown in FIG. 1.

In the master disk 10 according to this embodiment, an engaging member is configured with the upper tubular section 13, the lid section 14, the neck section 15, the flange section 16, and the like.

Figure 2:
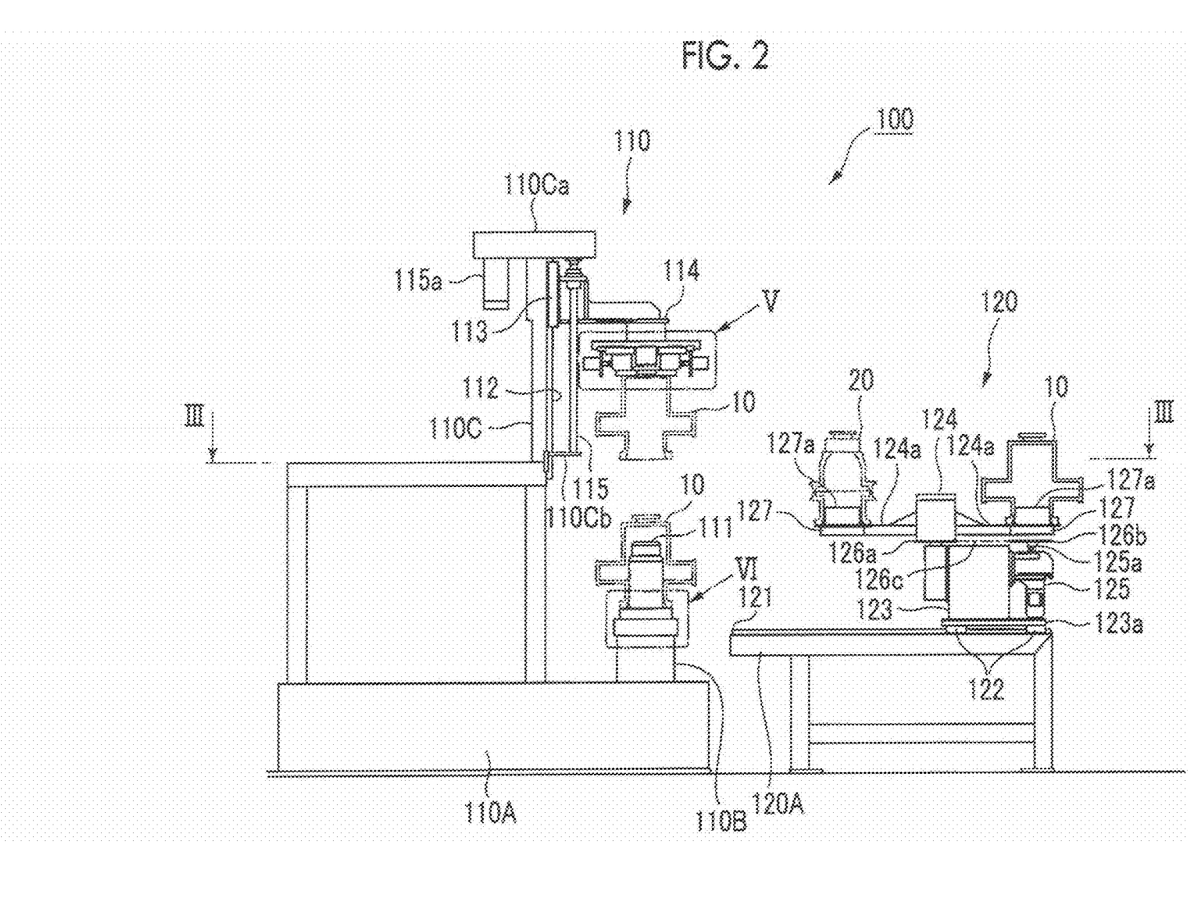
FIG. 2 is a side view showing a schematic structure of a main section of a main embodiment of a tire testing machine.
Figure 3:
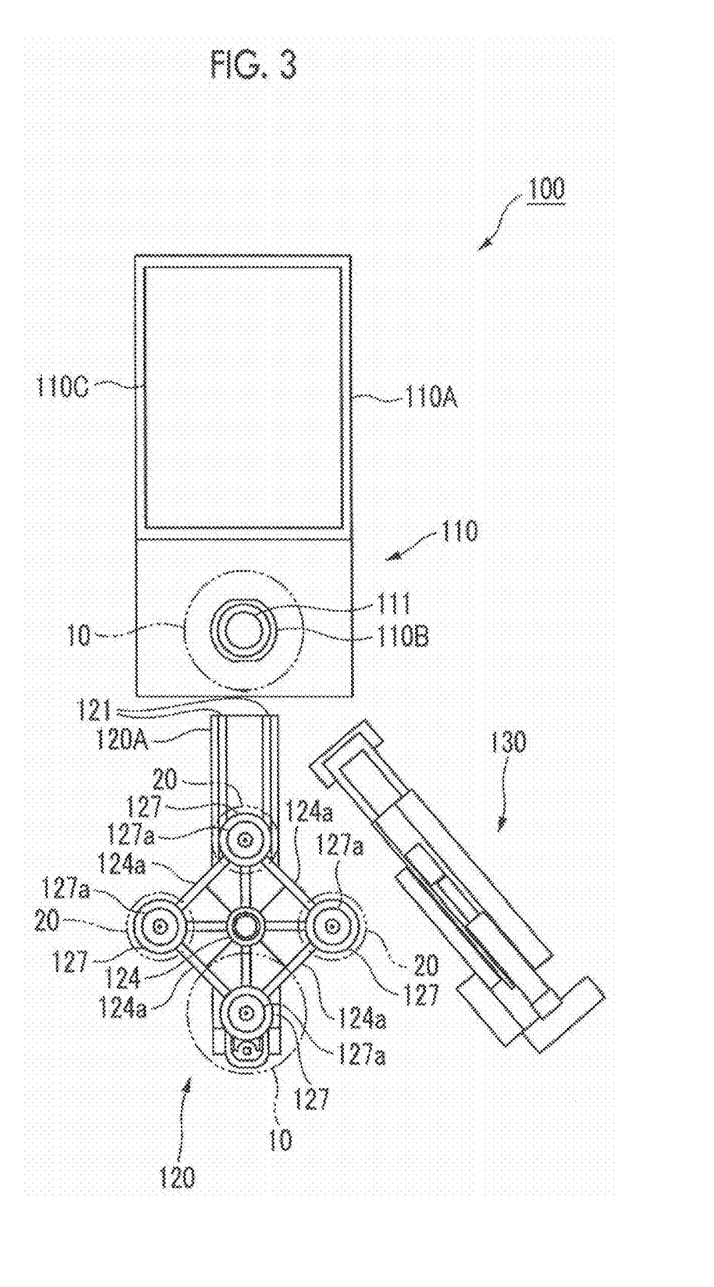
FIG. 3 is a sectional view taken along line III-III of FIG. 2 and viewed in the direction of an arrow.

Further, as shown in FIGS. 2 and 3, a tire testing machine 100 according to this embodiment is provided with: a tire holding device 110 on which a test rim 20 is detachably mounted and which detachably holds and rotates a tire by the test rim 20; a rim stocker 120 which detachably holds a plurality of test rims 20 corresponding to various sizes of tires; and a geometry measuring device 130 which measures the surface shape of the tire held on the test rim 20 of the tire holding device 110.

Figure 4:
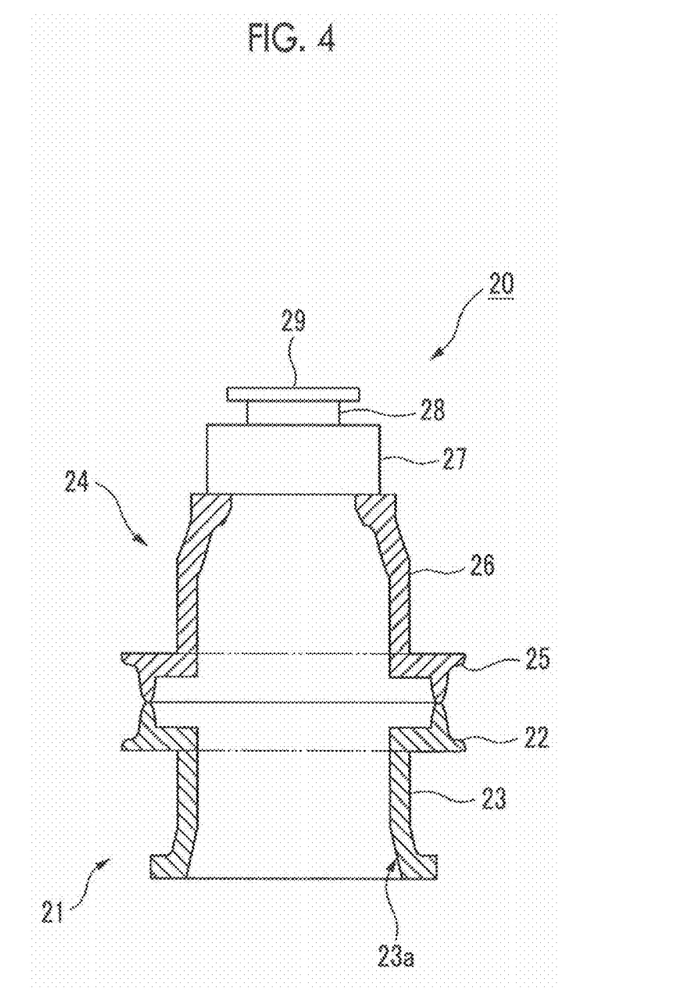
FIG. 4 is a sectional view showing a schematic structure of a main embodiment of a test rim.

As shown in FIG. 4, the test rim 20 is composed of a detachable lower rim body 21 and an upper rim body 24.

The lower rim body 21 is provided with: a lower rim section 22 which is oriented such that an axial direction thereof is directed in the up-and-down direction, and is detachably fitted to the lower side of the inner periphery of the tire; and a lower tubular section 23 having a cylindrical shape, in which the tip side (the upper end side) thereof is connected to the lower end side that is one end side in the axial direction of the lower rim section 22 so as to be coaxial with the lower rim section 22 and a guide surface 23a inclined in a tapered shape so as to have a larger diameter toward the base end side (the lower end side) is formed on the base end side (the lower end side) of an inner peripheral surface (specifically, refer to the above-described PTL 2 or the like).

The upper rim body 24 is provided with: an upper rim section 25 which is oriented such that an axial direction thereof is directed in the up-and-down direction, and is detachably fitted to the upper side of the inner periphery of the tire; an upper tubular section 26 having a cylindrical shape, in which the base end side (the lower end side) thereof is connected to the upper end side that is the other end side in the axial direction of the upper rim section 25 so as to be coaxial with the upper rim section 25; a disk-shaped lid section 27 coaxially mounted on the tip side (the upper end side) of the upper tubular section 26 so as to close the tip side (the upper end side) of the upper tubular section 26; a columnar neck section 28 coaxially mounted on the lid section 27; and a disk-shaped flange section 29 coaxially mounted on an upper portion of the neck section 28 and having a larger diameter than the neck section 28 (specifically, refer to the above-described PTL 2 or the like).

Figure 6:
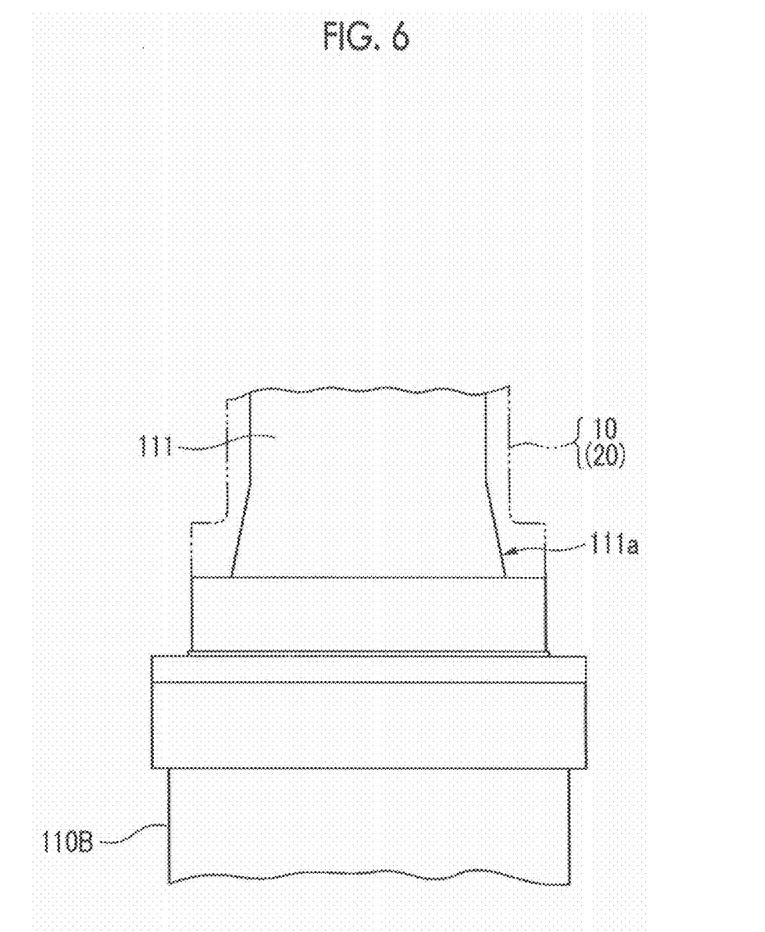
FIG. 6 is an explanatory diagram of a method of mounting the master disk of FIG. 1 and a method of removing the master disk.

As shown in FIGS. 2 and 3, in the tire holding device 110, a spindle 111 in which an axial direction thereof is directed in the up-and-down direction is rotatably provided on a pedestal 110B of a base 110A. A guide portion 111a inclined in a tapered shape so as to have a larger diameter toward the lower side is formed on the lower side of the outer peripheral surface of the spindle 111, as shown in FIG. 6.

As shown in FIG. 2, a guide rail 112 in which a longitudinal direction thereof is directed in the up-and-down direction is mounted on the pedestal 110B side of a frame 110C provided to be erected on the base 110A. A slider 113 capable of sliding along the longitudinal direction of the guide rail 112 is provided at the guide rail 112. The base end side of a support 114 oriented such that the tip side thereof is located above the spindle 111 is connected to the slider 113.

A ball screw shaft 115 in which an axial direction thereof is directed in the up-and-down direction is mounted on the support 114. The ball screw shaft 115 is supported, at an upper end portion and a lower end portion thereof, on the frame 110C through brackets 110Ca and 110Cb, and is made so as to be able to move the support 114 up and down by being rotated by an operation of a drive motor 115a.

Figure 5:
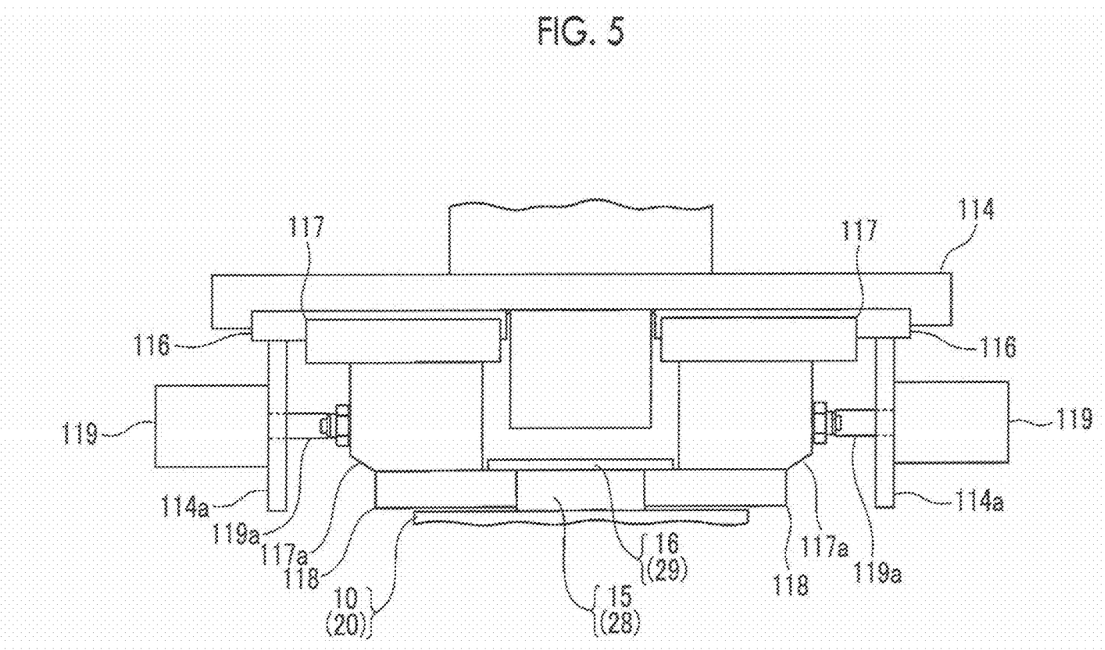
FIG. 5 is an explanatory diagram of a method of mounting the master disk of FIG. 1 and a method of removing the master disk.

As shown in FIGS. 2 and 5, a pair of guide rails 116 in which a longitudinal direction thereof is directed along a radial direction of the spindle 111 is mounted on the lower surface on the tip side of the support 114 so as to be located on a straight line centered on the position of a shaft center of the spindle 111. A slider 117 slidable along each of the guide rails 116 is provided at each of the guide rails 116. The base end side of each of a pair of engaging arms 118 oriented such that the tip side thereof faces in a direction of the shaft center of the spindle 111 is mounted on each of the sliders 117 through a connecting block 117a.

The tip side of each of rods 119a of a pair of air cylinders 119 in which an axial direction thereof is directed along the longitudinal direction of the guide rail 116 is connected to the connecting block 117a. Each of the air cylinders 119 is supported on the support 114 through a bracket 114a.

That is, a configuration is made such that if the rods 119a of the air cylinders 119 are extended, the tip sides of the paired engaging arms 118 move so as to approach each other and if the rods 119a of the air cylinders 119 are contracted, the tip sides of the paired engaging arms 118 move away from each other.

In the tire holding device 110 according to this embodiment, upper rim body holding means is configured with the support 114, the guide rails 116, the sliders 117, the engaging arms 118, the air cylinders 119, and the like, upper rim body lifting and lowering means is configured with the guide rail 112, the slider 113, the ball screw shaft 115, and the like, and test rim moving and exchanging means is configured with the upper rim body holding means, the upper rim body lifting and lowering means, and the like.

As shown in FIGS. 2 and 3, in the rim stocker 120, a guide rail 121 in which a longitudinal direction thereof is directed toward the spindle 111 is laid on a base frame 120A. A slider 122 slidable along the longitudinal direction of the guide rail 121 is provided on the guide rail 121. A support table 123 is mounted on the slider 122 through a support plate 123a. A turning shaft 124 in which an axial direction thereof is directed in the up-and-down direction is rotatably supported on the support table 123. A sprocket 126a is coaxially mounted on the turning shaft 124.

Further, a servomotor 125 having a drive shaft 125a in which an axial direction thereof is directed in the up-and-down direction is mounted on the support table 123. A sprocket 126b is coaxially mounted on the drive shaft 125a of the servomotor 125. An endless chain 126c is wound around the sprockets 126a and 126b, and the drive shaft 125a is rotated by an operation of the servomotor 125, whereby the turning shaft 124 can be rotated through the sprockets 126a and 126b and the endless chain 126c.

A stocker frame 127 which supports the test rim 20 and the like is mounted around the turning shaft 124 through a connecting member 124a, and a plurality of (in this embodiment, four) stocker frames 127 are disposed at predetermined intervals along a circumferential direction of the turning shaft 124. A pedestal 127a is provided on each of the stocker frames 127.

That is, a configuration is made such that the stocker frame 127 which is located above the spindle 111 side of the support table 123 can be selectively switched by rotating the turning shaft 124 by rotating the drive shaft 125a of the servomotor 125 and the stocker frame 127 which is located on the spindle 111 side of the support table 123 can be positioned above the spindle 111 by moving the support table 123 toward the spindle 111 side along the guide rail 121 through the slider 122.

In the rim stocker 120 according to this embodiment, advancing and retreating means is configured with the guide rail 121, the slider 122, the support table 123, and the like, and switching means is configured with the turning shaft 124, the servomotor 125, the sprockets 126a and 126b, the endless chain 126c, the stocker frame 127, and the like.

As shown in FIG. 3, the geometry measuring device 130 is disposed in the vicinity of the tire holding device 110 and is made so as to be able to measure the surface shape such as concavity and convexity or undulation of a tire held on the spindle 111 through the test rim 20 by extending and operating the tip side so as to be located in the vicinity of the spindle 111 of the tire holding device 110 (refer to, for example, PTL 1 or the like).

Next, a tire shape inspection method according to this embodiment using the tire testing machine 100 as described above will be described.

First of all, the master disk 10 is placed on the pedestal 127a of one stocker frame 127 of the rim stocker 120 of the tire testing machine 100, and on the other hand, the test rim 20 corresponding to each of various sizes of tires is placed on the pedestal 127a of the other stocker frame 127 of the rim stocker 120 of the tire testing machine 100.

Then, when carrying out the inspection of the surface shape of the tire, the turning shaft 124 is rotated by an operation of the servomotor 125 such that the stocker frame 127 of the rim stocker 120, on which the test rim 20 corresponding to the tire to be inspected is placed, is located on the spindle 111 side of the tire holding device 110, and the support table 123 is slid along the guide rail 121 through the slider 122 such that the stocker frame 127 is located above the spindle 111 of the tire holding device 110.

Next, if the ball screw shaft 115 is rotated by an operation of the drive motor 115a so as to lower the engaging arms 118 of the tire holding device 110, the neck section 28 of the upper rim body 24 of the test rim 20 on the stocker frame 127 is located between the facing tips of the engaging arms 118.

Subsequently, if each of the rods 119a of the air cylinders 119 is extended, the tip sides of the paired engaging arms 118 clamps the neck section 28 of the upper rim body 24 and the upper surfaces of the engaging arms 118 are engaged with the lower surface of the flange section 29 of the upper rim body 24.

Continuously, after the test rim 20 is removed from the pedestal 127a of the stocker frame 127 by being lifted through the engaging arms 118 by rotating the ball screw shaft 115 by an operation of the drive motor 115a so as to raise the engaging arms 118, if the support table 123 is slid along the guide rail 121 through the slider 122 so as to be returned to the original position thereof, the ball screw shaft 115 is rotated by an operation of the drive motor 115a so as to lower the engaging arms 118 again, whereby the test rim 20 is lowered through the engaging arms 118, and thus the lower tubular section 23 of the lower rim body 21 is fitted and mounted on the spindle 111.

At this time, since the tapered guide portion 111a having a larger diameter toward the lower side is formed on the lower side of the outer peripheral surface of the spindle 111 and the tapered guide surface 23a having a larger diameter toward the lower end side is formed on the lower end side of the inner peripheral surface of the lower tubular section 23 of the lower rim body 21 of the test rim 20, it is possible to easily perform mounting of the test rim 20 on the spindle 111 and it is possible to easily perform alignment of the test rim 20 with respect to the spindle 111.

Next, the upper rim body 24 is separated from the lower rim body 21 by lifting only the upper rim body 24 through the engaging arms 118 by rotating the ball screw shaft 115 by an operation of the drive motor 115a so as to separate the lower rim body 21 and the upper rim body 24 of the test rim 20 from each other and raise the engaging arms 118 again (specifically, refer to PTL 2 or the like).

In this way, the test rim 20 having been placed on the stocker frame 127 of the rim stocker 120 is held by the tire holding device 110 (the above is a test rim mounting step).

Then, after a tire is conveyed to above the spindle 111 by a conveyor or the like and the lower rim section 22 of the lower rim body 21 is fitted to the inner periphery of the tire, the upper rim section 25 of the upper rim body 24 is fitted to the inner periphery of the tire by rotating the ball screw shaft 115 by an operation of the drive motor 115a so as to lower the engaging arms 118, and the upper rim body 24 and the lower rim body 21 are integrated (specifically, refer to PTL 2 or the like), and thereafter, the rods 119a of the air cylinders 119 are contracted to move the tip sides of the paired engaging arms 118 so as to move away from each other, whereby the engaging arms 118 are separated from the neck section 28 and the flange section 29 of the upper rim body 24.

In this way, the tire is held on the test rim 20 mounted on the spindle 111.

Subsequently, the geometry measuring device 130 is operated so as to be extended and the spindle 111 rotates, whereby the surface shape such as concavity and convexity or undulation of the tire is measured, and thus the presence or absence of a defect on the surface of the tire is inspected (the above is an inspection step).

In this way, if the surface shape of the tire is measured and the inspection of the presence or absence of a defect is ended, the geometry measuring device 130 is operated so as to be contracted, thereby being returned to the original state, each of the rods 119a of the air cylinders 119 is extended, thereby clamping the neck section 28 of the upper rim body 24 again at the tip sides of the paired engaging arms 118, and the upper surfaces of the engaging arms 118 are engaged with the lower surface of the flange section 29 of the upper rim body 24 again, and thereafter, the upper rim body 24 and the lower rim body 21 are separated from each other (specifically, refer to PTL 2 or the like), and the upper rim body 24 is separated from the lower rim body 21 and the tire by lifting only the upper rim body 24 through the engaging arms 118 by rotating the ball screw shaft 115 by an operation of the drive motor 115a so as to raise the engaging arms 118 again.

Then, after the tire is carried out from above the spindle 111 by a conveyor or the like and removed from the lower rim section 22 of the lower rim body 21, a new tire is conveyed to above the spindle 111.

Hereinafter, by repeating the above-described operations, it is possible to consecutively inspect the tires one after another.

If the inspection of the surface shape of the tire is performed by a specified number of times or for a specified period of time, instead of the test rim 20, the master disk 10 is mounted on the spindle 111 of the tire holding device 110.

Specifically, first, the lower rim body 21 and the upper rim body 24 of the test rim 20 held by the spindle 111 and the engaging arms 118 of the tire holding device 110 are transferred and returned to the pedestal 127a of the stocker frame 127 initially disposed, of the rim stocker 120, by the procedure reverse to the above (the above is a test rim removal step).

Then, after the turning shaft 124 is rotated by an operation of the servomotor 125 such that the stocker frame 127 with the master disk 10 placed thereon is located above the spindle 111 of the tire holding device 110, the neck section 15 of the master disk 10 is located between the facing tips of the engaging arms 118 by rotating the ball screw shaft 115 by an operation of the drive motor 115a so as to lower the engaging arms 118 of the tire holding device 110.

Subsequently, the rods 119a of the air cylinders 119 are extended, thereby clamping the neck section 15 of the master disk 10 at the tip sides of the paired engaging arms 118 and causing the upper surfaces of the engaging arms 118 to be engaged with the lower surface of the flange section 16 of the master disk 10 (refer to FIG. 5).

Continuously, after the master disk 10 is lifted and removed from above the pedestal 127a of the stocker frame 127 through the engaging arms 118 by rotating the ball screw shaft 115 by an operation of the drive motor 115a so as to raise the engaging arms 118, if the support table 123 is slid along the guide rail 121 through the slider 122 so as to be returned to the original position, the ball screw shaft 115 is rotated by an operation of the drive motor 115a so as to lower the engaging arms 118 again, whereby the master disk 10 is lowered through the engaging arms 118, and thus the lower tubular section 12 is fitted and mounted on the spindle 111 (refer to FIG. 6).

At this time, since the tapered guide portion 111a having a larger diameter toward the lower side is formed on the lower side of the outer peripheral surface of the spindle 111 and the tapered guide surface 12a having a larger diameter toward the lower end side is formed on the lower end side of the inner peripheral surface of the lower tubular section 12 of the master disk 10, it is possible to easily perform mounting of the master disk 10 on the spindle 111 and it is possible to easily perform alignment of the master disk 10 with respect to the spindle 111.

Next, the engaging arms 118 are separated from the neck section 15 and the flange section 16 of the master disk 10 by moving the tip sides of the paired engaging arms 118 so as to be separated from each other by contracting each of the rods 119a of the air cylinders 119.

In this way, the master disk 10 having been placed on the stocker frame 127 of the rim stocker 120 is mounted on the spindle 111 of the tire holding device 110 (the above is a master disk mounting step).

Then, confirmation or correction of the measurement accuracy of the geometry measuring device 130 is performed by measuring the simulated tire section 11 of the master disk 10 with the geometry measuring device 130 by extending and operating the geometry measuring device 130 and rotating the spindle 111 (the above is a confirmation and correction step).

After the confirmation or correction of the measurement accuracy of the geometry measuring device 130 is performed in this way, instead of the master disk 10, the test rim 20 corresponding to a tire to be inspected from now is mounted on the spindle 111 of the tire holding device 110 again.

That is, after the master disk 10 mounted on the spindle 111 of the tire holding device 110 is transferred and returned to the pedestal 127a of the stocker frame 127 initially disposed, of the rim stocker 120 by removing it from the spindle 111 by the procedure reverse to the above (the above is a master disk removal step), the above-described procedure is repeatedly performed so as to mount the test rim 20 corresponding to a tire to be inspected on the spindle 111 of the tire holding device 110 again.

In this way, it is possible to continuously inspect the tires consecutively while maintaining the inspection accuracy.

That is, in the master disk 10 according to this embodiment, the master disk 10 is provided with the engaging members 13 to 16 which are detachably engaged with the test rim moving and exchanging means 112 to 119 of the tire holding device 110, whereby the master disk 10 can be automatically exchanged for the test rim 20 between the stocker frame 127 of the rim stocker 120 and the spindle 111 of the tire holding device 110.

For this reason, it is not necessary for a worker to manually perform mounting or removal of the master disk 10 on or from the spindle 111 of the tire holding device 110 of the tire testing machine 100, and thus it is possible to remarkably reduce a load on the worker, and it is possible to greatly shorten a time when the work of inspecting the surface shape of a tire is temporarily stopped, and thus it is possible to remarkably suppress a decrease in working efficiency.

Therefore, according to this embodiment, it is possible to easily carry out mounting work or removal work of the master disk 10 with respect to the spindle 111 of the tire holding device 110 of the tire testing machine 100, and thus it is possible to greatly improve the efficiency of the inspection work.

Further, since it is not necessary for a worker to manually perform mounting or removal of the master disk 10 with respect to the spindle 111, weight limitation of the master disk 10 can be greatly relaxed, and thus it is possible to variously set the conditions of the master disk 10.

Further, since it is possible to shorten a time when the inspection work is temporarily stopped, it becomes possible to relatively frequently perform confirmation or correction of the measuring accuracy of the geometry measuring device 130, and thus it is possible to more reliably suppress a decrease in the accuracy of the geometry measuring device 130.

Other Embodiments

In the embodiment described above, the engaging member of the master disk 10 is configured with the upper tubular section 13, the lid section 14, the neck section 15, the flange section 16, and the like. However, as another embodiment, for example, it is also possible to configure the engaging member with only the neck section and the flange section with the upper tubular section and the lid section omitted.

Further, in the embodiment described above, the master disk 10 is automatically exchanged by using the test rim moving and exchanging means 112 to 119 of the tire holding device 110 of the tire testing machine 100. However, as another embodiment, for example, it is also possible to perform automatic exchange by installing a dedicated exchange device which performs only the exchange of the master disk 10.

However, if the master disk 10 is automatically exchanged by using the test rim moving and exchanging means 112 to 119 of the tire holding device 110 of the tire testing machine 100, as in the embodiment described above, compared to a case of performing automatic exchange by installing a dedicated exchange device which performs only the exchange of the master disk 10, there is very little waste in terms of not only installation space but also cost, and therefore, it is very preferable.

INDUSTRIAL APPLICABILITY

According to the master disk, the master disk mounting method, and the master disk removal method according to the present invention, the mounting work or the removal work can be easily carried out and the efficiency of the inspection work can be greatly improved. Therefore, the master disk, the master disk mounting method, and the master disk removal method according to the present invention can be very beneficially used in the tire manufacturing industry.

The invention claimed is:

1. A tire testing machine comprising:
a test rim capable of holding a tire to be inspected;
a master disk used for a calibration of the tire testing machine;
a tire holding device having a spindle to which one of the test rim and the master disk is detachably attached and configured to rotate the spindle with the one attached thereto;
a rim stocker configured to hold the test rim with the tire and the master disk so as to be detachably attached to the rim stoker; and
a geometry measuring device configured to measure a surface shape of the tire attached to the spindle via the test rim and the master disk attached to the spindle; wherein
the test rim includes lower and upper rim bodies capable of detachably attached to each other, the lower rim body being provided with
a lower rim section, and
a lower tubular section having a cylindrical shape, in which the upper end side of the lower tubular section is connected to the lower end side of the lower rim section so as to be coaxial with the lower rim section and a first guide surface inclined in a tapered shape so as to have a larger diameter toward the lower end side of the lower rim section is formed on an inner peripheral surface of the lower rim section close to the lower end side thereof,
the master disk is provided with
a simulated tire section simulating the tire, and
a first tubular section having a cylindrical shape, in which the upper end side of the first tubular section is connected to the lower end side of the simulated tire section so as to be coaxial with the simulated tire section and a second guide surface inclined in a tapered shape so as to have a larger diameter toward the lower end side of the first tubular section is formed on an inner peripheral surface of the first tubular section close to the lower end side thereof, wherein the simulated tire section and the first tubular section are formed as a one-piece body, and
wherein
the spindle is capable of rotating around a vertical axis extending a longitudinal direction of the spindle and is provided with a guide portion inclined in a tapered shape so as to have a larger diameter toward the lower side of the spindle and which is formed on the outer peripheral surface of the spindle close to the lower end side thereof, wherein, when the master disk is mounted on the spindle, the guide portion is brought into contact with the second guide surface thereby performing alignment of the master disk with respect to the spindle.

2. The tire testing machine according to claim 1, further comprising
a transporter configured to transport the test rim and the master disk between the rim stocker and the tire holding device.

3. The tire testing machine according to claim 2, wherein the master disk further includes an engaging member which is provided so as to be removably held by the transporter, and
the engaging member includes a neck section disposed on the other end side in the axial direction of the simulated tire section so as to be coaxial with the simulated tire section, and a flange section coaxially provided at the neck section and having a larger diameter than the neck section.

4. The tire testing machine according to claim 2, wherein the transporter includes
a engaging arm capable of picking-up the test rim or the master disk,
a first guide rail installed on the base frame of the testing machine such that a longitudinal direction of the first guide rail is directed in the up-and down,
a first slider capable of sliding in the longitudinal direction of the first guide rail,
a support of which a base end is connected to the first slider and supporting the engaging arm,
a second guide rail installed on the base frame such that a longitudinal direction of the second guide rail is directed toward the spindle,
a second slider capable of sliding in the longitudinal direction of the second guide rail, and
a support table mounted on the second slider and supporting the rim stocker.

5. A tire shape inspection method with the use of the tire testing machine according to claim 1, the method comprising:
mounting the test rim on the spindle of the tire holding device with transferring the test rim from the rim stocker to the tire holding device while guiding the first guide surface of the test rim by the guide portion of the spindle;
attaching the tire to the test rim mounted on the spindle;
measuring a surface shape of the tire attached to the test rim using the geometry measuring device;
detaching the tire from the test rim after measuring the surface of the tire;
removing the test rim from the spindle with transferring the test rim from the tire holding device to the rim stocker, after detaching the tire from the test rim;
mounting the master disk on the spindle with transferring the test rim from the rim stocker to the tire holding device while guiding the second guide surface of the master disk by the guide portion of the spindle;
measuring a surface shape of the simulated tire section of the master disk using the geometry measuring device for the calibration of the tire holding device; and
removing the master disk from the spindle with transferring the master disk from the tire holding device to the rim stocker, after measuring the surface of the simulated tire section.

* * * * *